F. W. WATERMAN.
CONVEYER FOR PULP ARTICLES.
APPLICATION FILED APR. 18, 1917.
1,292,178.
Patented Jan. 21, 1919.
2 SHEETS—SHEET 2.
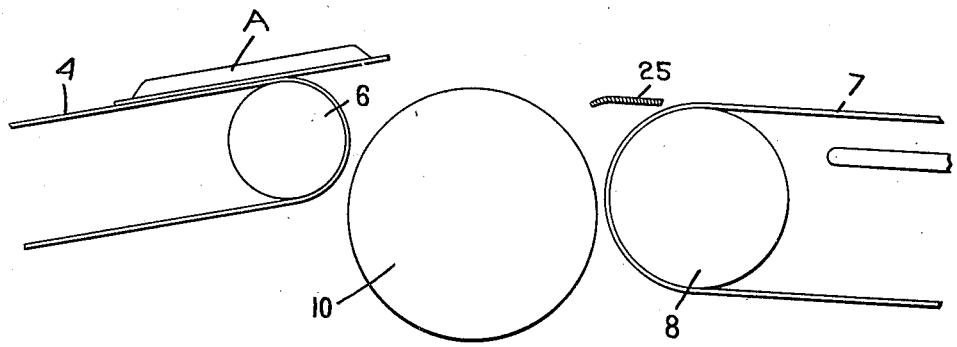
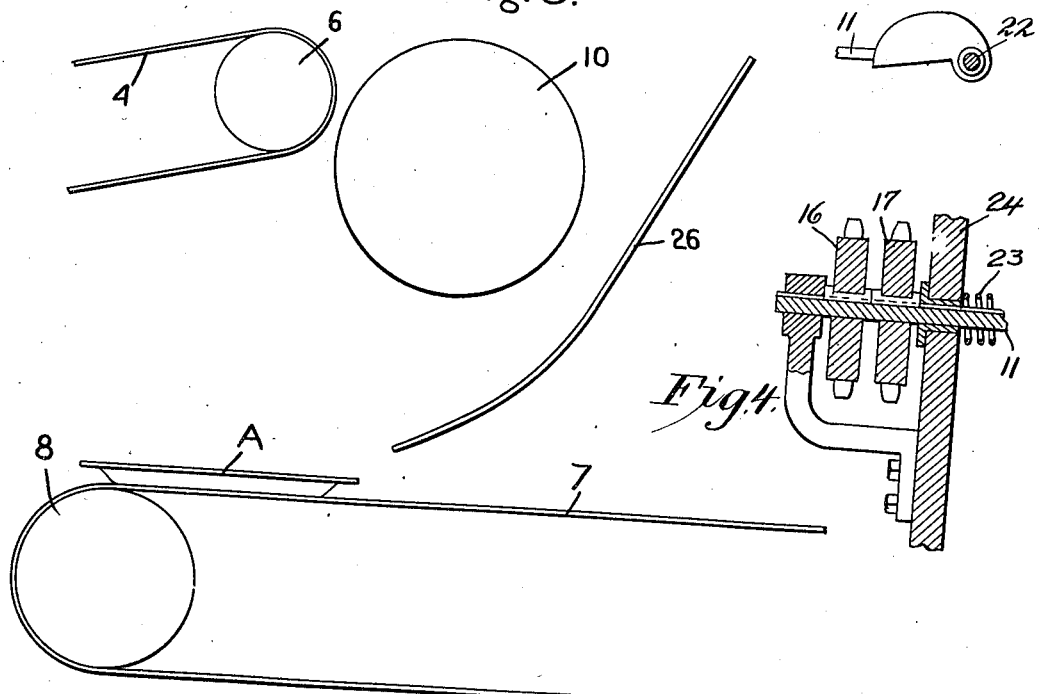
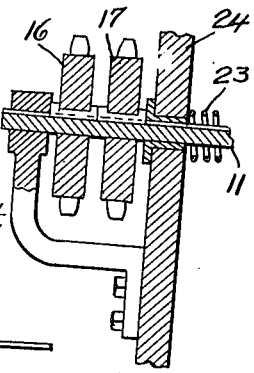
Inventor.
Frank W. Waterman
by Heard Smith & Tennant.
Attys.

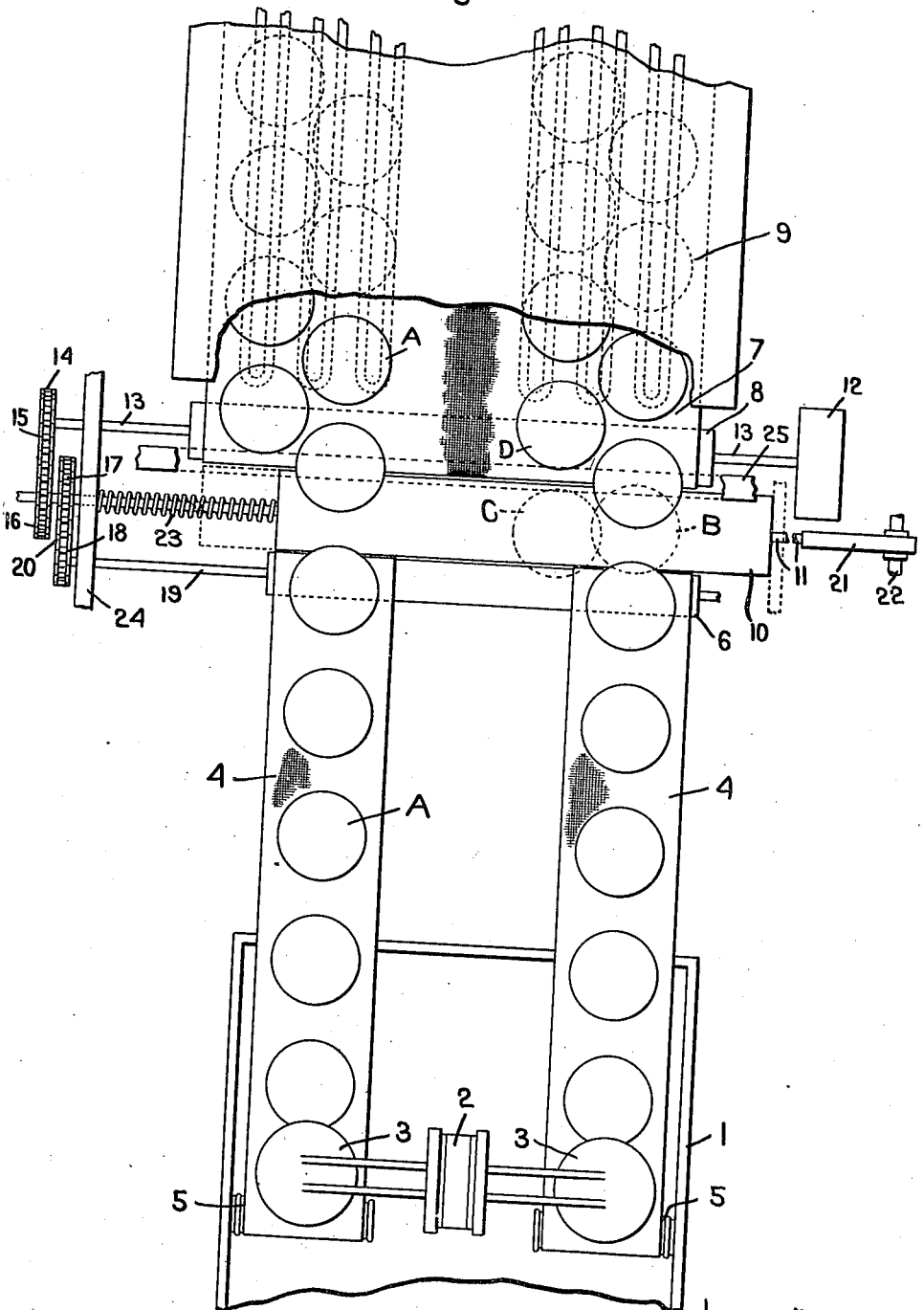

UNITED STATES PATENT OFFICE.

FRANK W. WATERMAN, OF BALTIMORE, MARYLAND, ASSIGNOR TO KEYES FIBRE COMPANY, OF WATERVILLE, MAINE, A CORPORATION OF MAINE.

CONVEYER FOR PULP ARTICLES.

1,292,178.  Specification of Letters Patent.  Patented Jan. 21, 1919.

Application filed April 18, 1917. Serial No. 162,892.

*To all whom it may concern:*

Be it known that I, FRANK W. WATERMAN, a citizen of the United States, and resident of Baltimore, State of Maryland, have invented an Improvement in Conveyers for Pulp Articles, of which the following description, in connection with the accompanying drawing, is a specification, like characters on the drawing representing like parts.

This invention relates to improvements in conveying mechanism and has for its object to provide means whereby a series of articles delivered to one conveyer may be transferred to another conveyer in different relation to one another than that in which they were arranged upon the first conveyer.

A preferred embodiment of the invention is disclosed herein as applied to a machine for making articles from pulp such as that disclosed in my prior Patent No. 1,139,002 in which a series of articles or preferably a pair of series of articles are delivered respectively to two conveyers which carry them away from the machine.

In the manufacture of articles such as plates, from pulp the articles are first molded and then carried through a drier which dries out the moisture in the molded articles and leaves them in a hard condition ready for use.

In drying, the articles are deposited upon an endless conveyer, usually formed of reticulated wire which travels through a heating chamber or oven, usually a plurality of conveyers being used to transport the articles alternately from one end of the oven to the other.

By the use of the present invention the articles may be deposited upon the transporting conveyer which carries them through a drier in a different and preferably staggered relation so that a greater number of articles may be carried at one time upon a conveyer of a given length than has heretofore been possible where the articles have been delivered in succession from a preliminary or receiving conveyer. Furthermore, by the use of the present invention the movement of the transporting conveyer may be reduced so that the articles will be subjected for a long period of time to the action of the heat of the oven as they pass through it.

In the preferred embodiment of the invention disclosed herein the transferrer comprises a traveling member adapted to receive the articles successively from the preliminary conveyer, means being provided to move the transferrer transversely of the direction of movement of said articles and to deliver them in staggered relation upon the transporting conveyer which is driven at a slower speed than that of the preliminary conveyer and the transferrer.

The invention is disclosed in the accompanying drawings in a more or less diagrammatic form in its relation to a molding machine for articles made of pulp and a drier for treating said articles. It will be understood however, that the disclosure herein is illustrative of the invention and not restrictive and that the same may be applied to many other uses to which it may be adapted.

In the drawings;

Figure 1 is a plan view in somewhat diagrammatic form of a preferred embodiment of my invention, Fig. 2 is a diagrammatic side elevation partially in section, and,

Fig. 3 is a similar view of a modified form of the invention,

Fig. 4 is a vertical sectional view of the bearings, and the longitudinally movable shaft for the transferrer showing the manner in which the sprocket wheels are feathered thereon, Fig. 5 is a detail view of the cam for moving the transferrer axially, shown as engaging the end of the transferrer shaft.

The invention is disclosed herein as applied to a pulp molding machine of the type illustrated in my prior Patent No. 1,139,002 aforesaid which comprises a pulp vat 1 having rotating molding mechanism mounted thereupon, the molds being adapted to dip successively into the pulp in the vat, suction being applied to cause a layer of pulp to adhere to the receiving faces of the mold, the compression member of the mold thereupon being forced against the layer of pulp upon the receiving member to form the molded article and the molded article finally discharged upon a conveyer in a manner which is fully disclosed in the patent aforesaid.

For the illustration of the present invention only a portion of a two-faced receiving mold 2 is shown together with the compression mold members 3 which are carried by arms pivotally connected to the supporting arms of the receiving mold members 2. The compression mold members 3 are illustrated in the drawing in the position to discharge articles such as plates upon preliminary conveyers which carry them from the molding machines.

These preliminary conveyers are in the form of endless belts 4 formed of reticulated wire and are mounted upon rollers 5 within the vat supported upon suitable stub shafts carried by the walls of the vat 1 and upon driving rollers 6 which may be journaled in suitable bearings not shown.

Heretofore the conveyers 4 have delivered the molded articles directly to a transporting conveyer which carried them through the heating chamber of a suitable drier of the usual type so that the articles pass through the drier in an alined series. In order to dry the articles properly a long drying chamber was necessary or the articles were required to be carried back and forth a number of times. Furthermore, the preliminary conveyers 4 were separated to a considerable distance to permit the passage of the rotating molds therebetween and consequently the intermediate portion of the endless transporting conveyer which carried the articles through the drier was not utilized.

By the present invention the articles are transferred from the preliminary conveyer to the transporting conveyer which carries them through the drier in staggered relation so that by using a transporting conveyer of a slightly greater width than that heretofore used approximately twice as many articles may be carried upon a given length of the same.

The transporting conveyer as illustrated in the accompanying drawing comprises an endless conveyer 7 of reticulated material which is mounted upon suitable rollers 8 (only one of which is shown) and extends through the usual drying chamber 9 in which a series of heating coils 10 are located beneath the upper lead of the conveyer.

A transferrer is interposed between the delivery end of the preliminary conveyers 4 and the receiving end of the transporting conveyer 7. This transferrer preferably is in the form of a cylindrical roller 10, but may be any other form of traveling conveyer, and preferably is driven at about the same surface speed as that of the preliminary conveyer 4.

The transporting conveyer 7 which carries the articles through the drier is driven at a slower speed. In order to deposit the articles taken from the preliminary conveyer 7 in a different, preferably staggered relation, means are provided for moving the transferrer transversely of the direction of movement of the article supporting surface of the preliminary and transporting conveyers.

In the preferred embodiment illustrated in the accompanying drawing a cylindrical transferring member 10 is mounted upon a shaft 11 which is slidably supported in suitable bearings so that the roller may be rotated and at the same time moved longitudinally. Any desirable mechanism may be used for accomplishing this result.

As illustrated in the accompanying drawings the roller 8 of the transporting conveyer is positively driven through a driving pulley 12 fixedly secured upon its shaft 13. The opposite end of the shaft 13 has a sprocket 14 which drives through a sprocket chain 15 a sprocket wheel 16 slidably feathered upon the shaft 11 of the transferring roller 10.

The relative dimensions of the sprocket wheels 14 and 16 are substantially two to one so that the surface speed of the transferrer is approximately twice that of the transporting conveyer 7. The preliminary conveyer 4 desirably may be driven from the shaft of the transferring roller and inasmuch as the speed of the transferrer and preliminary conveyer desirably is the same a sprocket wheel 17 slidably mounted upon the shaft 11 may be utilized to drive a smaller sprocket wheel 18 upon the shaft 19 of the roller 6 through a sprocket chain 20 passing over the sprocket wheels 17 and 18. Any suitable mechanism may be provided for giving endwise movement to the transferring rollers 10. As illustrated herein a cam 21 mounted upon a shaft 22 and driven by suitable mechanism, not shown, engages the end of the shaft 11, the cam being so proportioned and timed as to cause a quick endwise movement of the roller 6 to occur at the time the article is nearly or wholly supported by the roller. The transferring roller 10 may be conveniently moved in the other direction by a helical spring 23 surrounding the shaft 11 and bearing at one end upon a suitable abutment 24 such as the frame of the machine and at its opposite end against the end of the roller 10. A plate 25 desirably is interposed between the transferrer 10 and the adjacent end of the transporting conveyer 7 to support a portion of the article as it is being delivered from the transporting conveyer to the latter.

In the operation of the machine a series of articles such as plates A are delivered in succession upon the preliminary conveyers 4. When they reach the transferrer and the same is in the position shown in the drawings in full line, the plates are carried directly from the preliminary conveyers 4 to the transporting conveyer 7, in direct alinement.

When a succeeding plate is engaged by the transferrer and reaches the position B indicated in dotted lines in Fig. 1 the transferrer is thrust transversely of the direction of movement of the conveyers 4 and 6 by the action of the cam 21 so that the article is carried to the position C.

The rotation of the transferrer 10 then forces the article across the supporting plate 25 until it engages the conveyer 7 in the position D illustrated in Fig. 1. Inasmuch as the conveyer 7 moves at substantially one half the speed of the conveyer 4 and the transferrer 10 the articles will be deposited upon a transporting conveyer 7 in the staggered relation illustrated in the drawings so that nearly twice as many articles will be carried by the transporting conveyer as would be the case if the same were delivered successively in alinement upon the transporting conveyer.

By reason of this staggered relation a given length of the transporting conveyer 7 carries approximately twice as many articles as would otherwise be deposited upon it and as heretofore stated the speed of the transporting conveyer through the drier is greatly reduced thus economizing in the use of these conveyers which are of expensive construction and wear out quite rapidly.

In the molding of plates from machines of the character above described the plate is usually deposited upon the preliminary conveyer upside down and it is sometimes found desirable to reverse its position during the first drying operation. A convenient means of accomplishing this purpose and at the same time preserving the advantages of this invention heretofore described is illustrated in Fig. 3 in which the transferring roller 10 is shown in a position to deliver the articles upon an inclined plate or chute 26, the lower end of which desirably is slightly upwardly curved and is adapted to deliver the articles, such as plates, right side up upon the transporting conveyer 7.

In this construction as well as in the one more fully explained the transferring roller 10 may be reciprocated endwise, that is, transversely of the direction of movement of the conveyers 4 and 7 so that the articles will be deposited in staggered relation in this embodiment of the invention as well as in the other.

It is to be understood that the embodiment of the invention which is shown more or less diagrammatically herein is illustrative merely and not restrictive and that various modifications in structure, form and relation of parts may be made within the meaning and scope of the following claims.

Having thus described my invention what I claim as new and desire to secure by Letters Patent is:

1. Conveying mechanism comprising a preliminary traveling conveyer adapted to receive a series of articles, a traveling transporting conveyer and a cylindrical rotatable and axially reciprocable transferrer and means for actuating the same to transfer said articles from the preliminary conveyer to the transporting conveyer and depositing them upon the transporting conveyer in different relation to one another than that in which they were arranged upon said preliminary conveyer.

2. Conveying mechanism comprising a preliminary traveling conveyer adapted to receive a series of articles, a traveling transporting conveyer, a transferring member intermediate of the preliminary conveyer and the transporting conveyer positioned to receive the articles from the preliminary conveyer and deliver them to the transporting conveyer and means for actuating said receiving conveyer, said transferring member and said transporting conveyer at correlated speeds which will cause said transferring member to deposit the articles upon the transporting conveyer in a closely staggered relation.

3. Conveying mechanism comprising a preliminary traveling conveyer adapted to receive a series of articles, a traveling transporting conveyer and a cylindrical transferrer, means for actuating the same to cause the preliminary conveyer and the transferrer to be driven at a higher rate of speed than that of the transporting conveyer and means for reciprocating said transferrer laterally of the direction of movement of said conveyers whereby the articles will be deposited upon the transporting conveyer in staggered relation.

4. Conveying mechanism comprising a preliminary traveling conveyer adapted to receive a series of articles, a traveling transporting conveyer and a cylindrical transferrer, means including a cam for intermittently reciprocating said transferrer transversely of the direction of movement of said conveyers and resilient means for restoring said transferrer to original position.

5. In combination with a machine for molding articles from pulp, a pair of endless conveyers positioned to receive the articles, a transporting conveyer for said articles, a rotating cylindrical transferrer positioned intermediate of said receiving conveyers and said transporting conveyer and means for actuating said transferrer to cause said articles to be deposited upon said transporting conveyer in staggered relation.

6. In a machine for making articles from pulp, a transporting conveyer for carrying the articles slowly, a conveyer for receiving the articles from said molding machine, a cylindrical transferring member intermediate of said receiving conveyer said transporting conveyer and means for reciprocating said transferrer and means for driving said receiving conveyer and said transferrer at a higher rate of speed than said transporting conveyer whereby the transferring member will deposit the articles upon the transporting conveyer in staggered relation.

7. In a machine for molding articles from pulp comprising parallel conveyers to receive said articles, a transporting conveyer for said articles, transferring means for delivering said articles from said preliminary conveyers to said transporting conveyer comprising a cylindrical member interposed between the adjacent ends of said preliminary conveyers and said transporting conveyer, means for driving said preliminary conveyers and said transferrer at a higher rate of speed than that of said transporting conveyer and means for intermittently reciprocating said cylindrical member to cause the same to deposit articles received from said preliminary conveyers upon said transporting conveyer in staggered relation to one another, substantially as described.

In testimony whereof, I have signed my name to this specification.

FRANK W. WATERMAN.